United States Patent Office 2,809,126
Patented Oct. 8, 1957

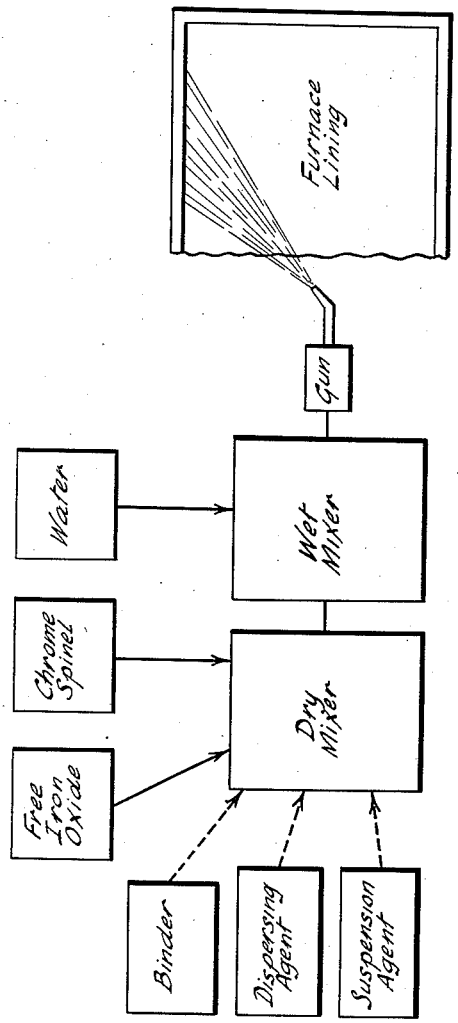

2,809,126

COMPOSITION AND METHOD OF COATING THE REFRACTORY SURFACE OF A FURNACE HEREWITH

Samuel F. Murphy, Jr., San Francisco, Calif., and Raymond J. Demaison, New York, N. Y., assignors to Quigley Company, Inc., New York, N. Y., a corporation of New York Continuation of application Serial No. 99,574, June 16, 1949. This application May 18, 1955, Serial No. 509,422

8 Claims. (Cl. 117—54)

This invention relates to furnace roof maintenance for certain important kinds of ultra-high-temperature industrial furnaces. The procedure described is of practical value on various refractory roofs, including those usual ones composed of silica bricks, of acid character. The invention is useful also for roofs composed of bricks of straight magnesite or chrome magnesite, both basic minerals, or of the neutral straight chrome material.

One type of such a furnace for which the present invention was particularly devised and developed, and which has long suffered from lack of a satisfactory roof maintenance system, is the so-called open-hearth steel-smelting furnace, which is and long has been in very important and extensive use and wherein interior atmospheric super-temperatures exist of the order of 3000° F. or a range of about 2800° to 3100° F. A comparable but less problematical furnace type is the well known reverberatory furnace used in copper smelting plants, with temperatures up to 2800° F. Both of these types, even if their arched roofs are composed of improved silica bricks, nevertheless, deteriorate rapidly, under the extreme temperatures and other destructive factors within the furnace. This deterioration even with the best maintenance heretofore available requires frequent suspensions and shut downs of the furnace to permit patching, repairing or even reconstruction of the furnace wall. This results in extensive and costly economic losses in operation, and serious reduction in plant output.

In the best prevailing repair system the production losses due to being out of commission for roof repair may be arrived at by simple calculations, which show that approximately 4200 tons of steel production are lost per year per furnace, which may be very largely attributed to the inadequacy of the available roof repair systems.

This invention comprises the spraying of the roof or lining surface while the furnace is at full heat with successive thin coatings of a new and peculiar cement having the properties of adhering to the surface and, itself, forming a part of this invention; which cement then enters into union with the lining to set and form a hard adherent surface of extraordinary refractoriness. The success of the process depends in part upon the peculiar properties of the cement when thus applied and the cement has its peculiar value because of the novel manner in which it is applied and the reactions which it undergoes when so applied.

The cement of this invention is essentially a chrome ore material including, as a chief constituent, a union of chromic oxide, $Cr_2O_3$ with iron oxide. The $Cr_2O_3$ is preferably used as embodied in the mineral chromite, a natural spinel of the form of $FeO\ Cr_2O_3$, and it is this spinel which gives to the coating its real resistance value. In this spinel the chromic oxide and the iron oxide are united in the proportions of 68% and 32%.

The cement of this invention requires a proportion of iron oxide which is higher than this. The percentage of iron oxide in the material should be about 5% more than sufficient to form the spinel crystal, preferably between 4 and 6%. This excess may herein be termed free oxide.

The most practical source of chromite for use in the process is a chrome ore which contains a preponderant quantity of a chrome iron spinel. Such ores frequently contain also a quantity of free iron oxide which may be taken into account in making up the formula. If the free oxide present is less than the quantity of free oxide required for the process, a quantity of iron oxide will be added to make up the deficiency. The chrome ore which contains chromite may and preferably does contain other crystalline combinations, as the magnesia spinel $MgO \cdot Al_2O_3$, which may be in similar crystalline relation or union with, rather than in mere mixture with, the chromite; also present may occur a small fraction of $SiO_2$ which is a functionally negligible factor; the chromite or chromic oxide being the main or major or characterizing constituent. Besides FeO and $Cr_2O_3$ and MgO and $Al_2O_3$ there is a fifth available spinel-forming oxide $Fe_2O_3$ (ferric) that may be coupled in union with other oxides. The oxides of Fe and Mg and Al have fusing functions and with them may be included $Na_2O$ among others.

The composition of this invention, in its most effective form, comprises in the following proportions:

| | |
|---|---|
| Chromite | 82–92%. |
| Free iron oxide (fusing agent) | 4–6%. |
| A binder agent | 6–12%. |
| A dispersing agent | .25–5% of the binding agent. |
| A suspension agent | 1–5%. |

We can now refer to these ingredients more specifically.

The chromite, to which we have already referred, is the main treating agent but which of itself will not adhere to the walls.

The fusing or fluxing agent, also described above, consists of the excess portion of the ferrous and other oxides, whether these be found in the chrome ore from which the chromite was also obtained or whether it be added to the mixture.

The binder agent is one or more of a conventionally known or other refractory binders, such as one of the sodium silicates, which may, in the cement formula, be in the low percentage of 6 or under, but which is preferred at 8 percent with a range of about 6 to 12. Its sodium to silicate ratio may be about 1 to 2 and is preferably fixed at about 1 to 1.9, this small difference having the large effect of increasing by as much as 50 percent, the ultimate bonding strength of the treated roof; acting as it does when the coating is being applied, to hold preliminarily the cement on the roof surface until the chemical bond is completed.

A particular one of the sodium silicates, namely $Na_2O \cdot 1.9SiO_2$, is highly advantageous and believed to be novel for the purpose; other available binders are $Na_2O \cdot 2SiO_2$ and $Na_2O \cdot 3.22SiO_2$.

The dispersing agent which is preferably added, may be one of several types, including (a) known conventional agents and, as preferred agents, (b) the metal salts of amyl sulphonic acid or (c) sulphonated petroleum products, and/or the salts thereof. This agent may be used in accompaniment or premixture with the chemical binder agent supra, and in amount may be small, for example about 2 percent, or between 0.25 and 5.00 percent of the amount of binder. The presence of the dispersing agent provides an improved binder action, the disperser cooperating to render the binder more adhesive and cohesive, with a more efficient coating layer upon the roof brick surface. A larger proportion than stated of the agent would have no appreciable advantage.

The suspension agent is usually a fine or colloidal fireclay, initially dry, but it may be an organic suspender, such as carboxy-methyl cellulose or equivalents. This agent should be added in a small way for conventional suspension purposes, for example, about or above 2 percent of the total formula, or between about one percent and a high of 5 or 6 percent, any larger addition being without corresponding utility.

The present invention includes the discovery that for the best results the correct proportions of components in the chemical composition of the refractory material or cement should be adjusted or caused to vary, depending upon certain factors, including first, the temperature of the roof surface at the time the cement is applied, and second, the highest temperature to which the refractory coating will be subjected under operating conditions.

In preparing the cement, the ingredients are finely pulverized and thoroughly mixed in proper portions. Sufficient water is then added to give the desired fluidity, giving it a specific gravity of about 2.2 to 2.6. The digestion of the slurry is assisted if it is heated.

The roof treating procedure may be effected by conventional apparatus of which an important item is the so-called spray-gun or refractory gun, the long known principles of which are shown in the patent to Bodfish, No. 1,574,183 of February 23, 1926, this or the like being adapted to project the cement, under observation and control, so as methodically to cover all affected or exposed surfaces.

When this cement composition is brought into contact with the silica or other refractory bricks, under high operating temperatures, the free iron oxide with the binding agents results in localized and limited fusing. Such fusion proceeds towards state of a highly gelatinous liquid, but only until the ever-changing ratio of free metal oxides to silica becomes such that solidification upon the roof surface takes place. There is then a rearrangement of the compounds, and this setting or solidification is the end point of the reaction; the result being that a fused chemical or sintered bond is formed between the silica brick and the applied refractory coating inclusive of the chromite and other spinel contents of the sprayed cement material.

As an example of the use of a commercial chrome ore as a basis for our refractory cement we may consider an ore the assay of which is as follows:

*Sample A*

| | Percent |
|---|---|
| $Cr_2O_3$ | 44.5 |
| FeO | 25.4 |
| MgO | 10.6 |
| $Al_2O_3$ | 14.6 |
| Other | 4.9 |

The formation of a spinel with 44.5 parts of $Cr_2O_3$ will bind within it 20.9 parts of the FeO leaving 4.5 parts free FeO.

The excess of free iron is within the range of free iron oxide specified (4 to 6%) so that no more iron oxide need be added.

Then considering another:

*Sample B*

| | Percent |
|---|---|
| $Cr_2O_3$ | 45.4 |
| FeO | 15.1 |
| MgO | 13.6 |
| $Al_2O_3$ | 13.8 |
| Other | 12.1 |

The formation of a chrome spinel with 45.4 parts of $Cr_2O_3$ would require 21.4 parts FeO. There is a lack therefore of 6.3 parts FeO to form the spinel and hence no free iron oxide.

A cement using this source of chromite, therefore, would require 6.3 parts of FeO to complete the spinel plus 4 to 6 parts as free FeO. That is an addition of 10.3 to 12.3 parts FeO.

A chrome ore may contain natural variations in proportions, and breaking down an analysis of the Example A type into the proportions of each of the metal oxides, ignoring any incidental $SiO_2$, the range may run somewhat as follows, in parts or percentages:

| | |
|---|---|
| $Cr_2O_3$ | 25 to 50 |
| FeO | 10 to 25 |
| $Al_2O_3$ | 8 to 26 |
| MgO | 5 to 20 |

The refractory chrome base material, of whatever formula, should be finely pulverized, the following ranges of particle size being satisfactory as an example:

| | Percent |
|---|---|
| To remain upon 100 mesh screen | 20 to 40 |
| To remain upon 200 mesh screen | 40 to 55 |
| To pass 200 mesh screen | 45 to 60 |

This application is a continuation of our prior application, Serial No. 99,574 for Furnace Roof Maintenance filed June 16, 1949, now abandoned.

What is claimed is:

1. The method of maintaining against progressive destructive impairment the refractory flame exposed surfaces of a high temperature furnace while the furnace is in operation, said surfaces being from the group consisting of silica bricks of acid character and magnesite and chrome magnesite, both basic materials, and neutral straight chrome material, said method including the steps of mixing a finely powdered chrome ore composition with water to produce a cement slurry, said composition comprising predominantly chromite which is insensitive to the operating temperature of the furnace and which determines the heat resisting properties of the final furnace surfaces, said chrome ore composition containing more than enough iron oxide to form an iron chrome spinel, the free iron oxide amounting to between 4% and 6% and serving as a fluxing agent, spraying the cement slurry under high pressure and in progressive fashion upon the flame exposed surfaces of the furnace while the furnace is in operation to form a heat resisting coating thereon, and utilizing the furnace heat, first, to activate the fluxing agent and produce a fusing bond between the chrome ore composition and the furnace surfaces as the coating is gradually built up by the spraying operation and, second, to set and harden the coating after it has been bonded to the furnace surfaces and convert it into a solid integrated sheet mass which protects the furnace surfaces against destructive impairment.

2. The method according to claim 1, wherein the chrome ore composition contains from 1 to 6 percent of a suspension agent, to aid in spraying the slurry upon the furnace surfaces.

3. The method of maintaining against progressive destructive impairment the refractory flame exposed surfaces of a high temperature furnace while the furnace is in operation, said surfaces being from the group consisting of silica bricks of acid character, and magnesite and chrome magnesite, both basic materials, and neutral straight chrome material, said method including the steps of mixing a finely powdered chrome ore composition with water to produce a cement slurry, said composition comprising predominantly chromite which is insensitive to the operating temperature of the furnace and which determines the heat resisting properties of the final furnace surfaces, said chrome ore composition containing more than enough iron oxide to form an iron chrome spinel, the free iron oxide amounting to between 4% and 6% and serving as a fluxing agent, and also containing from 6% to 12% of a binding agent to aid in preliminarily binding the solid particles to the furnace surfaces, spraying the cement slurry under high pressure and in progressive fashion upon the flame exposed surfaces of the furnace while the furnace is in operation to form a heat resisting coating thereon, and utilizing the furnace heat, first, to activate the fluxing agent and produce a fusing bond between the chrome ore composition and the furnace surfaces as the coating is gradually built up by the spraying operation and, second, to set and harden the coating after it has been bonded to the furnace surfaces and convert it into a solid integrated sheet mass which protects the furnace surfaces against destructive impairment.

4. The method according to claim 3, wherein the chrome ore composition contains a dispersing agent of from .25% to 5% of the binding agent, to modify the binding agent and aid it in preliminarily binding the solid particles to the furnace surfaces.

5. A heat resisting chrome ore composition adapted to be mixed and applied in slurry form to the refractory flame exposed surfaces of a high temperature furnace while the furnace is in operation, said composition comprising a mixture of chrome ore and from 1% to 6% of colloidal clay, all of the ingredients being finely ground, said chrome ore composition comprising predominantly chromite and containing more than enough iron oxide to form an iron chrome spinel, the free iron oxide amounting to between 4% and 6%.

6. A heat resisting chrome ore composition according to claim 5, which is composed essentially of a mixed crystal of chrome, iron, magnesium and aluminum oxides, the percentage of the chrome iron spinel being substantially 60% of the total chrome ore, and said chrome ore including a small percentage of free oxides from the group consisting of magnesium, aluminum and sodium, in addition to the free iron oxide.

7. A heat resisting chrome ore composition adapted to be mixed and applied in a slurry form to the refractory flame exposed surfaces of a high temperature furnace while the furnace is in operation, said composition comprising a mixture of chrome ore and from 1% to 6% of colloidal clay, and from about 6% to 12% of sodium silicate, all of the ingredients being finely ground, said chrome ore composition comprising predominantly chromite and containing more than enough iron oxide to form an iron chrome spinel, the free iron oxide amounting to between 4% and 6%.

8. A heat resisting chrome ore composition according to claim 7 which also contains a dispersing agent of from 0.25% to 5% of the sodium silicate.

References Cited in the file of this patent

UNITED STATES PATENTS

| | | |
|---|---|---|
| 2,279,260 | Benner | Apr. 7, 1942 |
| 2,407,725 | Schoenlaub | Sept. 17, 1946 |

FOREIGN PATENTS

| | | |
|---|---|---|
| 250,354 | Great Britain | Apr. 15, 1926 |